United States Patent
Wolf et al.

(10) Patent No.: US 11,891,814 B2
(45) Date of Patent: Feb. 6, 2024

(54) PREFABRICATED WALL PANEL WITH TONGUE AND GROOVE CONSTRUCTION

(71) Applicant: Westlake Royal Stone LLC, Houston, TX (US)

(72) Inventors: David H. Wolf, Newark, OH (US); James S. Belt, Utica, OH (US); William Smith, Pataskala, OH (US); Donn R. Vermilion, Newark, OH (US); Wayne J. Buoni, New Albany, OH (US); Joy Stickel, Columbus, OH (US)

(73) Assignee: Westlake Royal Stone LLC, Houston, TX (US)

( * ) Notice: Subject to any disclaimer, the term of this patent is extended or adjusted under 35 U.S.C. 154(b) by 713 days.

(21) Appl. No.: 16/720,842

(22) Filed: Dec. 19, 2019

(65) Prior Publication Data

US 2020/0123785 A1    Apr. 23, 2020

Related U.S. Application Data

(60) Continuation of application No. 16/447,624, filed on Jun. 20, 2019, now Pat. No. 10,557,273, which is a (Continued)

(51) Int. Cl.
*E04F 13/08* (2006.01)
*E04F 13/14* (2006.01)
(Continued)

(52) U.S. Cl.
CPC .......... *E04F 13/0894* (2013.01); *B29C 39/18* (2013.01); *B29C 39/36* (2013.01); (Continued)

(58) Field of Classification Search
CPC . E04F 13/0894; E04F 13/0873; E04F 13/147; E04F 15/02038
See application file for complete search history.

(56) References Cited

U.S. PATENT DOCUMENTS

| 448,733 A | 3/1891 | Sagendorph |
| 897,353 A | 9/1908 | Culley |

(Continued)

FOREIGN PATENT DOCUMENTS

| DE | 2044961 A1 | 3/1972 |
| DE | 102006008147 A1 | 8/2007 |

(Continued)

OTHER PUBLICATIONS

International Search Report and Written Opinion for Application No. PCT/US2007/025532, dated Apr. 21, 2008.

(Continued)

*Primary Examiner* — Edmund H Lee
(74) *Attorney, Agent, or Firm* — Bookoff McAndrews, PLLC (57) ABSTRACT

A prefabricated wall panel has a precast body including at least one decorative design element. In addition, the wall panel includes a mounting element having a first end embedded in the precast body and a second end projecting from the precast body. A groove is formed between the precast body and the second end of the mounting element along a first edge of the precast body. A tongue is formed along a second edge of the precast body opposite the first edge. The tongue and groove cooperate to allow prefabricated wall panels to be more easily installed on a support substrate.

19 Claims, 10 Drawing Sheets

Related U.S. Application Data continuation of application No. 15/870,059, filed on Jan. 12, 2018, now Pat. No. 10,378,216, which is a continuation of application No. 14/879,827, filed on Oct. 9, 2015, now Pat. No. 9,903,124, which is a continuation of application No. 14/299,250, filed on Jun. 9, 2014, now Pat. No. 10,329,775, which is a division of application No. 12/026,876, filed on Feb. 6, 2008, now Pat. No. 8,782,988.

(51) Int. Cl.

| | | |
|---|---|---|
| *B29C 39/18* | (2006.01) | |
| *B29C 39/36* | (2006.01) | |
| *B29D 99/00* | (2010.01) | |
| *E04F 15/02* | (2006.01) | |
| *B29L 31/10* | (2006.01) | |

(52) U.S. Cl.
CPC ........ *B29D 99/001* (2013.01); *E04F 13/0873* (2013.01); *E04F 13/147* (2013.01); *E04F 15/02038* (2013.01); *B29L 2031/10* (2013.01)

(56) References Cited

U.S. PATENT DOCUMENTS

| | | | |
|---|---|---|---|
| 1,276,894 A | * | 8/1918 | Flanders ............ B60R 13/0206 52/511 |
| 1,592,591 A | | 7/1926 | James et al. |
| 1,688,405 A | | 10/1928 | Stoehr et al. |
| 1,853,822 A | | 4/1932 | Joseph et al. |
| 1,853,824 A | | 4/1932 | Joseph et al. |
| 1,859,539 A | | 5/1932 | Kemper et al. |
| 1,872,522 A | | 8/1932 | Stuckey et al. |
| 1,976,947 A | | 10/1934 | Krauss et al. |
| 2,006,635 A | | 7/1935 | Farr et al. |
| 2,030,556 A | | 2/1936 | Ernest et al. |
| 2,031,680 A | | 2/1936 | Lloyd et al. |
| 2,182,523 A | | 12/1939 | Markowski et al. |
| 2,198,466 A | | 4/1940 | Stolze et al. |
| 2,209,283 A | * | 7/1940 | Ronzone ............... E04F 13/147 D25/151 |
| 2,214,387 A | | 9/1940 | Snyder et al. |
| 2,300,258 A | | 10/1942 | Joseph et al. |
| 2,305,280 A | | 12/1942 | Strunk et al. |
| D135,475 S | | 4/1943 | William |
| D135,476 S | | 4/1943 | William |
| 2,317,428 A | | 4/1943 | Anderson et al. |
| 2,329,610 A | | 9/1943 | Harman et al. |
| 2,592,244 A | | 4/1952 | Chamberlain et al. |
| 2,884,780 A | | 5/1959 | Chavez et al. |
| 2,991,592 A | | 7/1961 | Rauen et al. |
| 3,004,369 A | | 10/1961 | Kendrick et al. |
| 3,131,514 A | | 5/1964 | Metta et al. |
| 3,142,938 A | | 8/1964 | Eberhardt et al. |
| 3,177,279 A | | 4/1965 | Bilodeau et al. |
| 3,192,556 A | * | 7/1965 | Himelreich ............... E05D 1/02 16/225 |
| 3,217,453 A | * | 11/1965 | Medow .................. E04F 13/185 52/591.1 |
| 3,232,017 A | | 2/1966 | Prusinski et al. |
| 3,248,834 A | | 5/1966 | Charles et al. |
| 3,303,620 A | | 2/1967 | William et al. |
| 3,310,921 A | | 3/1967 | Perez et al. |
| 3,332,187 A | | 7/1967 | Arcari et al. |
| 3,335,048 A | | 8/1967 | Leon et al. |
| 3,344,011 A | | 9/1967 | Murray et al. |
| 3,350,827 A | | 11/1967 | Sugar et al. |
| 3,388,518 A | | 6/1968 | Scott et al. |
| 3,478,479 A | | 11/1969 | Papalia et al. |
| 3,496,694 A | | 2/1970 | Hicks et al. |
| 3,521,418 A | | 7/1970 | Bartoloni et al. |
| 3,524,790 A | | 8/1970 | Mason et al. |
| 3,533,206 A | | 10/1970 | Passeno, Jr. et al. |
| 3,613,326 A | | 10/1971 | Mollman et al. |
| 3,618,888 A | | 11/1971 | Wise et al. |
| 3,621,625 A | | 11/1971 | Medow et al. |
| 3,646,715 A | | 3/1972 | Pope et al. |
| 3,683,579 A | | 8/1972 | Beardsley et al. |
| 3,701,228 A | | 10/1972 | Taylor et al. |
| 3,740,910 A | | 6/1973 | Taylor et al. |
| 3,750,998 A | | 8/1973 | Shoe et al. |
| 3,754,365 A | * | 8/1973 | Carrick ............... E04F 13/0835 52/471 |
| 3,867,503 A | | 2/1975 | Shoe et al. |
| 3,868,801 A | | 3/1975 | Weiner et al. |
| 3,885,008 A | | 5/1975 | Martin et al. |
| 3,899,344 A | | 8/1975 | Jakel et al. |
| 3,905,170 A | | 9/1975 | Huettemann et al. |
| 3,908,326 A | | 9/1975 | Francis et al. |
| 3,968,610 A | | 7/1976 | Medow et al. |
| 4,001,361 A | | 1/1977 | Unruh et al. |
| 4,011,702 A | | 3/1977 | Matyas et al. |
| 4,026,083 A | | 5/1977 | Hoyt et al. |
| 4,034,528 A | | 7/1977 | Sanders et al. |
| 4,037,377 A | | 7/1977 | Howell et al. |
| 4,065,902 A | | 1/1978 | Lindal et al. |
| 4,102,106 A | * | 7/1978 | Golder ................ E04F 13/0864 52/553 |
| 4,191,521 A | | 3/1980 | Muldery et al. |
| 4,219,984 A | | 9/1980 | De San |
| 4,223,490 A | * | 9/1980 | Medow ................. E04F 13/185 52/553 |
| 4,241,554 A | | 12/1980 | Infantino |
| 4,266,382 A | | 5/1981 | Tellman et al. |
| 4,271,111 A | | 6/1981 | Sheber et al. |
| 4,299,069 A | | 11/1981 | Neumann et al. |
| 4,306,395 A | | 12/1981 | Carpenter et al. |
| 4,349,588 A | | 9/1982 | Schiffer et al. |
| 4,404,158 A | | 9/1983 | Robinson |
| 4,407,104 A | | 10/1983 | Francis |
| 4,453,359 A | | 6/1984 | Robinson |
| 4,468,903 A | | 9/1984 | Eaton et al. |
| 4,495,738 A | | 1/1985 | Sheber |
| 4,522,002 A | * | 6/1985 | Davis .................... E04F 13/185 52/309.1 |
| 4,553,366 A | | 11/1985 | Guerin |
| 4,589,241 A | | 5/1986 | Volpenhein |
| 4,638,617 A | | 1/1987 | James |
| 4,644,719 A | | 2/1987 | Salazar |
| 4,655,719 A | | 4/1987 | Sunray |
| 4,656,722 A | | 4/1987 | Armstrong |
| 4,665,673 A | | 5/1987 | Diana |
| 4,669,238 A | | 6/1987 | Kellis et al. |
| 4,680,911 A | | 7/1987 | Davis et al. |
| 4,689,931 A | | 9/1987 | Hodges |
| 4,773,201 A | | 9/1988 | Trezza |
| 4,858,410 A | | 8/1989 | Goldman |
| 4,932,182 A | | 6/1990 | Thomasson |
| 4,944,124 A | | 7/1990 | Armstrong |
| 4,946,632 A | | 8/1990 | Pollina |
| 5,042,215 A | | 8/1991 | Cremer et al. |
| 5,052,161 A | | 10/1991 | Whitacre |
| 5,072,562 A | | 12/1991 | Crick et al. |
| 5,076,037 A | | 12/1991 | Crick et al. |
| 5,172,532 A | | 12/1992 | Gibbar, Jr. |
| 5,228,249 A | | 7/1993 | Campbell |
| 5,228,937 A | | 7/1993 | Passeno |
| 5,232,646 A | | 8/1993 | Nasvik et al. |
| 5,249,402 A | | 10/1993 | Crick et al. |
| 5,271,878 A | | 12/1993 | Mizia et al. |
| 5,311,714 A | | 5/1994 | Passeno |
| 5,347,784 A | * | 9/1994 | Crick .................... E04F 13/185 52/546 |
| 5,373,676 A | | 12/1994 | Francis et al. |
| 5,379,561 A | | 1/1995 | Saito |
| 5,398,473 A | | 3/1995 | Chan |
| 5,515,659 A | | 5/1996 | MacDonald et al. |
| 5,537,792 A | | 7/1996 | Moliere |
| 5,540,023 A | | 7/1996 | Jaenson |
| 5,557,897 A | * | 9/1996 | Kranz .................... E04D 5/14 411/533 |
| 5,634,305 A | | 6/1997 | Erlanger |
| 5,637,236 A | | 6/1997 | Lowe |

(56) References Cited

U.S. PATENT DOCUMENTS

| | | | |
|---|---|---|---|
| 5,673,529 A | 10/1997 | Treister et al. | |
| 5,715,305 A | 2/1998 | Penzias et al. | |
| 5,715,637 A | 2/1998 | Hesterman et al. | |
| 5,787,666 A | 8/1998 | Sherry | |
| 5,819,486 A * | 10/1998 | Goodings | E04F 19/06 52/510 |
| 5,833,895 A | 11/1998 | Di Loreto | |
| 5,836,123 A | 11/1998 | Gulino | |
| 5,836,572 A | 11/1998 | Sugiyama | |
| 5,857,303 A | 1/1999 | Beck et al. | |
| 5,878,543 A | 3/1999 | Mowery | |
| 5,916,103 A | 6/1999 | Roberts | |
| 5,956,914 A | 9/1999 | Williamson | |
| 5,966,886 A | 10/1999 | Di Loreto | |
| 6,029,418 A | 2/2000 | Wright | |
| 6,050,037 A | 4/2000 | Gifford | |
| 6,134,855 A | 10/2000 | Beck | |
| 6,151,854 A | 11/2000 | Gutjahr | |
| 6,164,029 A | 12/2000 | Lee | |
| 6,237,288 B1 | 5/2001 | Jenkins et al. | |
| 6,237,294 B1 | 5/2001 | Rygiel | |
| 6,240,691 B1 | 6/2001 | Holzkaemper et al. | |
| 6,244,009 B1 | 6/2001 | Cerrato | |
| 6,253,511 B1 | 7/2001 | Boyer | |
| 6,253,515 B1 | 7/2001 | Kuelker | |
| 6,295,777 B1 * | 10/2001 | Hunter | E04F 13/18 52/311.1 |
| 6,315,489 B1 * | 11/2001 | Watanabe | E04F 13/0846 248/220.21 |
| 6,324,807 B1 | 12/2001 | Ishiko | |
| 6,336,303 B1 | 1/2002 | Vandeman et al. | |
| 6,355,193 B1 | 3/2002 | Stott | |
| 6,408,585 B1 | 6/2002 | Tajima | |
| 6,460,301 B1 | 10/2002 | McKee | |
| 6,467,229 B2 | 10/2002 | Azar | |
| 6,516,578 B1 | 2/2003 | Hunsaker | |
| 6,599,452 B1 | 7/2003 | Ferguson | |
| 6,609,342 B2 | 8/2003 | Hikai | |
| 6,615,560 B2 | 9/2003 | Ito | |
| 6,634,617 B2 | 10/2003 | Potvin | |
| 6,701,683 B2 | 3/2004 | Messenger et al. | |
| 6,729,090 B2 | 5/2004 | Messenger et al. | |
| 6,792,727 B2 | 9/2004 | Krieger | |
| D497,013 S | 10/2004 | Hughes | |
| 6,802,165 B1 | 10/2004 | Passeno | |
| 6,808,667 B2 | 10/2004 | Nasvik et al. | |
| 6,820,383 B2 | 11/2004 | Vos | |
| 6,830,405 B2 | 12/2004 | Watanabe | |
| 6,857,248 B2 | 2/2005 | Ouellet et al. | |
| 6,898,908 B2 | 5/2005 | Messenger et al. | |
| 6,904,780 B2 | 6/2005 | Bullinger et al. | |
| D510,146 S | 9/2005 | Attebery, II et al. | |
| 6,951,086 B2 | 10/2005 | Passeno | |
| 6,955,019 B2 | 10/2005 | Donlin et al. | |
| 6,968,659 B2 | 11/2005 | Boyer | |
| 6,973,756 B2 | 12/2005 | Hatzinikolas | |
| 6,990,778 B2 | 1/2006 | Passeno | |
| RE39,091 E | 5/2006 | Kuelker | |
| 7,096,629 B1 | 8/2006 | Cox | |
| 7,240,461 B1 | 7/2007 | Vandeman et al. | |
| 7,587,871 B2 | 9/2009 | Perry | |
| 7,617,647 B2 | 11/2009 | Turner et al. | |
| 7,647,738 B2 | 1/2010 | Nasvik | |
| 7,735,287 B2 | 6/2010 | Gaudreau | |
| 7,790,784 B2 | 9/2010 | Nasr et al. | |
| 7,980,037 B2 | 7/2011 | Trabue et al. | |
| 7,997,039 B2 | 8/2011 | Wolf et al. | |
| 8,042,309 B2 | 10/2011 | Wolf et al. | |
| 8,151,530 B2 | 4/2012 | Schwarz et al. | |
| 8,201,372 B2 | 6/2012 | Holt et al. | |
| 8,601,764 B2 | 12/2013 | Cahill et al. | |
| 8,726,594 B2 * | 5/2014 | Salazar | E04B 5/043 52/309.3 |
| 9,903,124 B2 | 2/2018 | Wolf et al. | |
| 2003/0066259 A1 * | 4/2003 | Sudweeks | E04F 13/147 52/506.05 |
| 2003/0154676 A1 | 8/2003 | Schwartz | |
| 2004/0006943 A1 | 1/2004 | Weick | |
| 2004/0107663 A1 | 6/2004 | Waggoner | |
| 2005/0005556 A1 | 1/2005 | Collier et al. | |
| 2005/0102946 A1 | 5/2005 | Stucky et al. | |
| 2005/0188642 A1 | 9/2005 | Correia | |
| 2005/0204466 A1 | 9/2005 | Luong | |
| 2005/0204666 A1 | 9/2005 | Passeno | |
| 2005/0210811 A1 | 9/2005 | Nasvik | |
| 2005/0229500 A1 | 10/2005 | Howard | |
| 2005/0252144 A1 | 11/2005 | MacDonald et al. | |
| 2005/0257475 A1 | 11/2005 | Gong et al. | |
| 2006/0053743 A1 | 3/2006 | Hatzinikolas | |
| 2006/0075712 A1 | 4/2006 | Gilbert et al. | |
| 2006/0107610 A1 | 5/2006 | Boserio | |
| 2006/0191232 A1 * | 8/2006 | Salazar | E04C 2/34 52/606 |
| 2006/0204466 A1 | 9/2006 | Littau et al. | |
| 2006/0260223 A1 | 11/2006 | Wang | |
| 2006/0265988 A1 | 11/2006 | Fujito et al. | |
| 2007/0022687 A1 | 2/2007 | Correia | |
| 2007/0044402 A1 | 3/2007 | Hess | |
| 2007/0137127 A1 | 6/2007 | Lincoln et al. | |
| 2007/0137128 A1 | 6/2007 | Viau et al. | |
| 2007/0144087 A1 | 6/2007 | Heath et al. | |
| 2007/0151190 A1 | 7/2007 | Huff et al. | |
| 2007/0175159 A1 | 8/2007 | Miniter | |
| 2007/0209308 A1 * | 9/2007 | Barrett | B28B 7/346 52/506.05 |
| 2007/0227087 A1 | 10/2007 | Nasr et al. | |
| 2007/0261353 A1 | 11/2007 | Cullen | |
| 2008/0005994 A1 | 1/2008 | Harney | |
| 2008/0028711 A1 | 2/2008 | Logan et al. | |
| 2008/0110116 A1 | 5/2008 | Brown et al. | |
| 2008/0115435 A1 | 5/2008 | Riviere | |
| 2008/0302050 A1 | 12/2008 | Kalkanoglu | |
| 2008/0313988 A1 | 12/2008 | MacDonald | |
| 2009/0049765 A1 | 2/2009 | Grant | |
| 2009/0056257 A1 | 3/2009 | Mollinger et al. | |
| 2009/0094914 A1 | 4/2009 | Jambois et al. | |
| 2009/0113837 A1 | 5/2009 | Mickelson | |
| 2009/0193742 A1 | 8/2009 | Wolf et al. | |
| 2009/0235600 A1 | 9/2009 | Logan et al. | |
| 2009/0249719 A1 | 10/2009 | Broehl et al. | |
| 2009/0304459 A1 | 12/2009 | MacDonald et al. | |
| 2011/0175255 A1 | 7/2011 | Wernette et al. | |
| 2011/0239578 A1 | 10/2011 | Wolf et al. | |
| 2014/0041331 A1 | 2/2014 | Buoni et al. | |

FOREIGN PATENT DOCUMENTS

| | | |
|---|---|---|
| EP | 0024359 A1 | 3/1981 |
| EP | 0182567 A2 | 5/1986 |
| FR | 2461073 A1 | 1/1981 |
| FR | 2561289 A1 | 9/1985 |
| FR | 2768452 A1 | 3/1999 |
| GB | 444503 A | 3/1936 |
| GB | 2371314 A | 7/2002 |
| JP | 2000226926 A | 8/2000 |
| JP | 2000297518 A | 10/2000 |
| NO | 2007142632 A1 | 12/2007 |
| WO | 2006042883 A2 | 4/2006 |
| WO | 2017074425 A1 | 5/2017 |

OTHER PUBLICATIONS

International Search Report and Written Opinion for Application No. PCT/US2009/033405, dated May 18, 2009.
Pulp Art Surfaces Catalog, published on May 27, 2011.
Related U.S. Appl. No. 14/299,250, filed Jun. 9, 2014.
Related U.S. Appl. No. 15/423,504, filed Feb. 2, 2017.

* cited by examiner

PREFABRICATED WALL PANEL WITH TONGUE AND GROOVE CONSTRUCTION

CROSS REFERENCE TO RELATED APPLICATIONS

This application is a continuation of U.S. application Ser. No. 16/447,624, filed on Jun. 20, 2019, now U.S. Pat. No. 10,557,273, which is a continuation of U.S. application Ser. No. 15/870,059, filed on Jan. 12, 2018, now U.S. Pat. No. 10,378,216, which is a continuation of U.S. application Ser. No. 14/879,827, filed on Oct. 9, 2015, now U.S. Pat. No. 9,903,124, which is a continuation of U.S. application Ser. No. 14/299,250, filed on Jun. 9, 2014, now U.S. Pat. No. 10,329,775, which is a divisional of U.S. application Ser. No. 12/026,876, filed on Feb. 6, 2008, now U.S. Pat. No. 8,782,988, the contents of each of which are herein incorporated by reference in their entirety.

TECHNICAL FIELD

This invention relates generally to the construction field and, more particularly, to a prefabricated wall panel incorporating a mounting element.

BACKGROUND OF THE INVENTION

Prefabricated or cast veneer wall panels have been developed as a quick and efficient way to provide a masonry appearance for a building while simplifying construction and lowering construction cost. The design elements of prefabricated wall panels typically simulate brick, stone, tile and other masonry building components or materials commonly used in the construction of buildings. Examples of prefabricated wall panels are disclosed in U.S. Pat. No. 3,142,938 to Eberhardt, U.S. Pat. No. 4,669,238 to Kellis et al, U.S. Pat. No. 5,379,561 to Saito and U.S. Pat. No. 5,673,529 to Treister et al, in published U.S. Patent Application Serial No. 2007/0137128 to Viau et al and in Co-pending patent application Ser. No. 11/647,751 owned by the Assignee of the present invention.

Prefabricated wall panels are typically made from reinforced construction materials such as fiberglass reinforced concrete. Prefabricated wall panels made from such reinforced materials are resistant to damage to handling during packaging, shipping and installation. However, further improvements in durability to decrease loss due to breakage are still desired. The present invention relates to a prefabricated wall panel incorporating a mounting element to enhance durability and provide significantly improved handling characteristics as well as tongue and groove construction to simplify installation.

BRIEF SUMMARY

In accordance with the purposes of the present invention as described herein, an improved prefabricated wall panel is provided. The prefabricated wall panel comprises a precast body including at least one decorative design element and a mounting element including a first end embedded in the precast body and a second end projecting from the precast body. The wall panel includes at least one protrusion and at least one keying hole in the mounting element. The protrusion may take the form of a dimple and have an interior diameter of between approximately 0 and approximately 7.6 centimeters and a depth of between approximately 0.30 and approximately 0.35 centimeters. An aperture is provided in the dimple. The aperture has a diameter of about 0.3175 centimeters and is concentrically positioned in the dimple. In addition, the wall panel includes at least one weep hole in the mounting element.

In one possible embodiment, the wall panel includes a groove formed between the precast body and the second end of the mounting element along a first edge of the precast body. In addition, a tongue is formed along a second edge of the precast body opposite the first edge. That tongue is formed by the precast body. The tongue is sized and shaped to be received in the groove so that prefabricated wall panels of the present invention may be vertically stacked and interconnected to form a wall.

The first end of the mounting element extends in a first plane and the second end of the mounting element extends in a second plane wherein the second plane is parallel to the first plane. The mounting element further includes a transition section that connects the first end to the second end and transitions between the first and second planes. In one possible embodiment the wall panel includes multiple decorative design elements and the groove is provided behind at least one of the multiple decorative design elements.

In accordance with an additional aspect of the present invention the mounting element is made from a material selected from a group consisting of metal, plastic, steel, corrosion resistant steel, aluminum, stainless steel, zinc, copper and combinations thereof. The mounting element is formed as a solid sheet, as a mesh or as a combination of solid sheet and mesh.

The precast body is made from a material selected from a group consisting of concrete, fiber reinforced concrete, gypsum, other cementitious materials and mixtures thereof The precast body includes reinforcing fibers selected from a group of fibers consisting of glass fibers, mineral fibers, natural fibers, polymer fibers, E-glass fibers, AR-glass fibers and mixtures thereof.

In another possible embodiment, the wall panel includes a slot formed in the second end of the mounting element and a tab projecting from a second edge of the precast body opposite the first edge. The tab is formed by the mounting element. The mounting element may be one piece construction or two piece construction. In one embodiment the mounting element is at least one piece, in yet another embodiment the mounting element is at least two pieces. In one possible embodiment the mounting element is a solid body. In another possible embodiment at least a portion of the mounting element is mesh.

The tab is sized and shaped to be received in the slot so that prefabricated wall panels of the present invention may be interconnected to form a wall. The first end of the mounting element extends in a first plane, the second end of the mounting element extends in a second plane and the tab of the mounting element extends in a third plane between the first and second planes. In addition, the slot is provided in a transition section that connects the first and second ends of the mounting element. That slot also rests in the third plane.

In accordance with yet another aspect of the present invention a method is provided for forming a wall panel in a mold having a mold cavity. The method comprises the steps of: (a) positioning a mounting element with a first end extending into the mold cavity and a second end extending from the mold cavity; (b) adding casting material into the mold cavity so as to embed the first end of the mounting element in the casting material; (c) forming a tongue in the mold cavity from casting material captured under a dimensional flap; (d) forming a groove in the mold between the casting material and the first end of the mounting element;

(e) allowing the casting material to set; and (f) removing the wall panel from the mold. The method may also include adding casting material to the mold above a lower most surface of the dimensional flap. In addition, the method may include stretching the mold to free the tongue from under the dimensional flap while removing the wall panel from the mold.

In accordance with yet another aspect of the present invention, a mold is provided for forming a wall panel. The mold comprises a body including a mounting element support surface and a mold cavity. The body further includes a dimensional flap overlying a portion of the mold cavity. Still further, the mounting element support surface of the mold is provided along a first edge of a mold cavity and the dimensional flap is provided overlying a second edge of the mold cavity wherein the first edge is opposite the second edge.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiments of the present invention examples of which are illustrated in the accompanying drawings.

DETAILED DESCRIPTION

Figure 1:
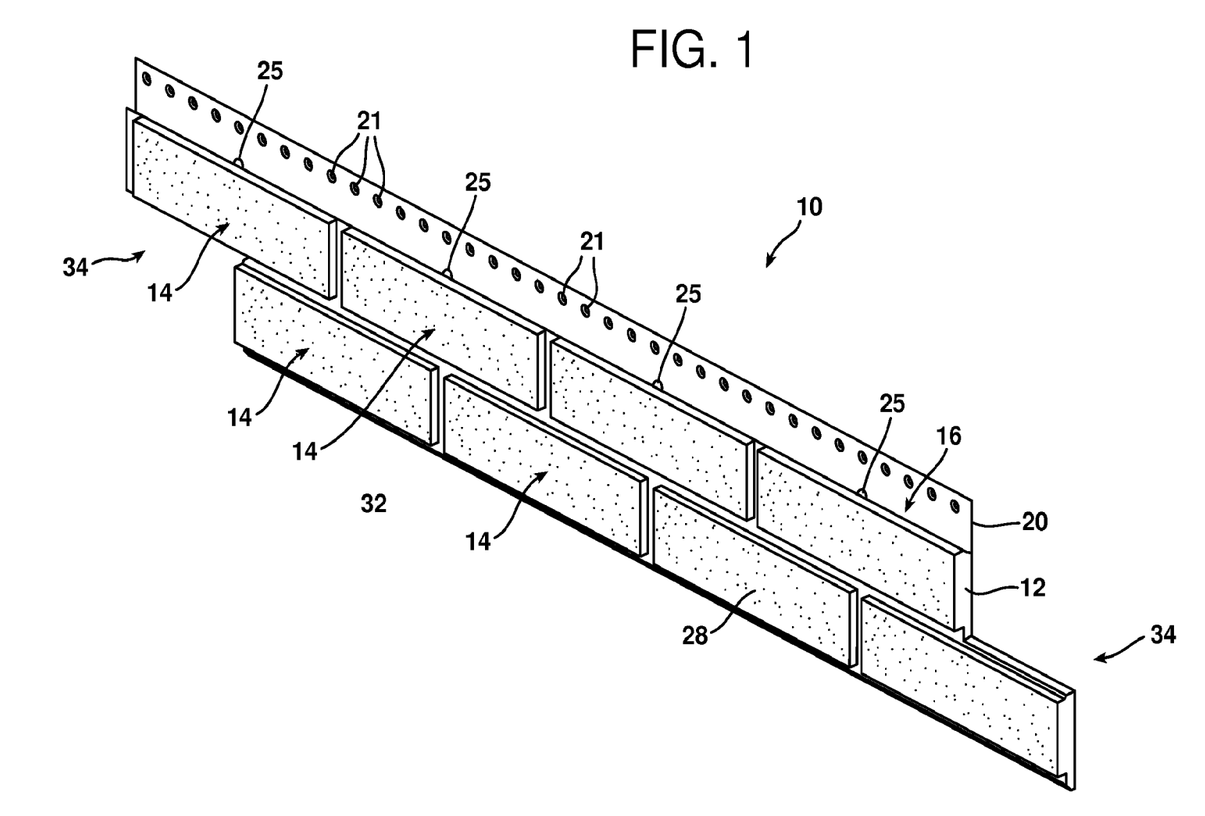
FIG. 1 is a front perspective view of the prefabricated wall panel of the present invention.

Reference is now made to FIG. 1 illustrating the prefabricated wall panel 10 of the present invention. Such a wall panel 10 may be used as a wall cladding for a building. Further applications include but are not limited to the construction of a fireplace surround or an outdoor living component such as a decorative wall or grill surround.

The prefabricated wall panel 10 comprises a precast body 12 including at least one decorative design element 14. As illustrated the design element 14 comprises two rows of overlapping brick with four brick in each row. It should be appreciated that substantially any other masonry material known in the art may be simulated including bricks of different sizes, stones of the same or different sizes and shapes, tiles of different sizes and shapes and the like.

The precast body 12 is made from a cast material such as concrete, reinforced concrete, gypsum, fiber reinforced gypsum, polymer modified gypsum, reinforced cementitious material and mixtures thereof. Typically the cast material reinforcement comprises fibers selected from a group of materials consisting of glass fibers, carbon fibers, mineral fibers, natural fibers, polymer fibers and mixtures thereof. Where glass fibers are used they are typically of the E-glass or AR-glass type which exhibits some alkali resistance.

Figure 2:
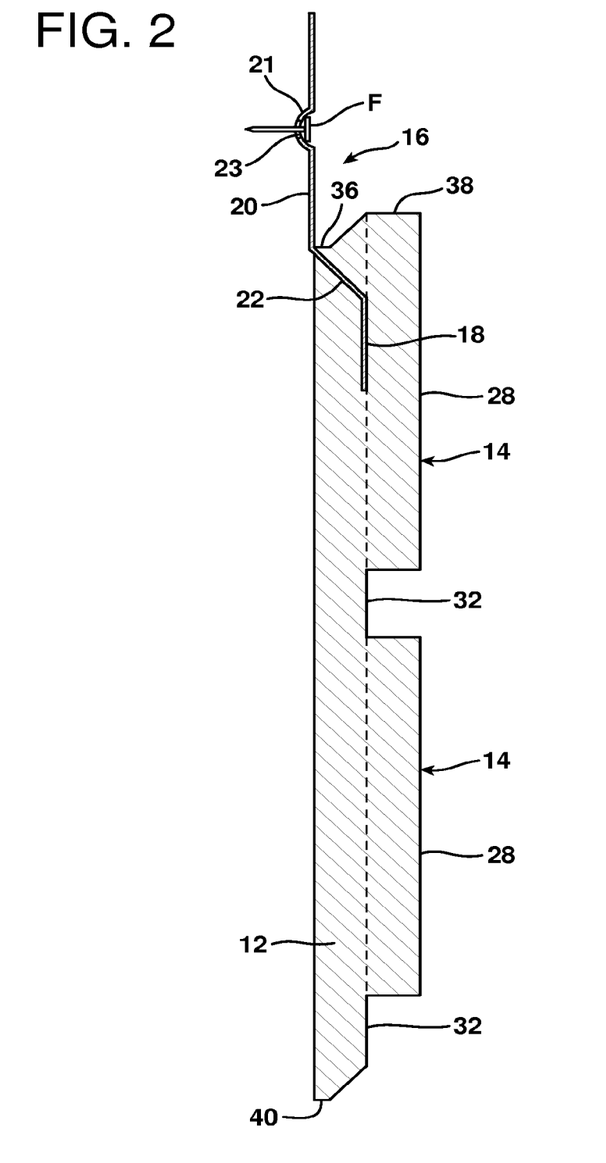
FIG. 2 is a cross-sectional view of the prefabricated wall panel illustrated in FIG. 1.

As best illustrated in FIGS. 1 and 2, the prefabricated wall panel 10 also includes a mounting element, generally designated by reference numeral 16. The mounting element 16 may be made from a material selected from a group consisting of wood, concrete, cellulose fiber board, polymer material, composite material, metal, plastic, reinforced plastic, thermoplastic, fiber composite, reinforced wood, steel, corrosion-resistant steel, aluminum, stainless steel, zinc, copper and combinations thereof. The corrosion-resistant steel may take any number of forms including, but not limited to, galvanized, galvanneal, Gavalume™ brand, tin coating, chromium coating, nickel coating, phosphorous coating, magnesium coating, copper coating, zinc coating, weathering steels (i.e., alloys of steel with small additions of copper, aluminum, nickel and/or phosphorous), polymer coatings and paint.

Polymer materials useful for the making of the mounting element 16 include various thermoplastic and thermoset resins including but not limited to polyolefins, polyesters, polyvinylchloride, polypropylene, polyethylene, polyamide, epoxy, vinyl ester, acrylic, polystyrene, ABS, melamine and mixtures thereof. Composite materials used to make the mounting element 16 include a reinforcing material and a matrix binder. Appropriate reinforcing materials useful in the present invention include but are not limited to glass fibers, natural fibers, mineral fibers, basalt fibers, carbon fibers, kenaf fibers, jute fibers, hemp fibers, E-glass fibers, C-glass fibers, R-glass fibers, S-glass fibers, ECR-glass fibers, AR-glass fibers and mixtures thereof. It should be appreciated that substantially any type of glass fiber may be used for reinforcement fibers. Glass fibers appropriate for use in the present invention may be loose chopped strand or glass mat and include those available under the trademark ADVANTEX. Matrix binder materials useful for this purpose include but are not limited to polyolefins, polyesters, polyvinylchloride, polypropylene, polyethylene, polyamide, epoxy, vinyl ester and mixtures thereof.

As best illustrated in FIG. 2, the mounting element 16 includes a first end 18 that is embedded in the precast body 12 and a second end 20 that projects from the precast body. This may be accomplished by positioning the mounting element 16 so that the first end 18 projects into the mold cavity in which the body 12 is cast. After positioning the mounting element 16, the cast material is sprayed, injected or otherwise added to the mold. The cast material of the body 12 covers the front and the rear major faces of the first end 18 of the mounting element 16. When set, the body 12 securely holds the mounting element 16 in position. Typically, the first end 18 includes a series of spaced keying holes 17. These holes 17 fill with the cast material and ensure that the mounting element 16 is firmly seated and secured in the cast body 12 once the material sets.

As illustrated in FIGS. 1 and 2, the second end 20 of the mounting element 16 projects upwardly from the top edge of the precast body 12. In the illustrated embodiment, the mounting element 16 includes a transition section 22 connecting the first end 18 with the second end 20. In one embodiment, the transition section 22 forms an included angle of between 0° and about 180°. In another embodiment, as illustrated in FIG. 2, the transition section 22 forms an included angle of between about 130° and about 140° and most typically 135° with the first end 18.

As further illustrated in FIG. 1, the second end 20 of the mounting element 16 may include a series of protrusions 21. The protrusion 21 may take the form of dimples, slots, ribs or any other structure that provides a set back means and can receive a nail or fastener. In the illustrated embodiment, the protrusion 21 is a dimple. The dimples 21 project away from the front face 28 of the wall panel 10. The dimples 21 function to provide an air space A between the wall panel 10 and the sheathing S or other building substrate to which the wall panel 10 is fastened. The wall panel 10 is fastened or secured to the sheathing S by means of fasteners such as nails or screws F (see FIGS. 2 and 3) that are received and pass through the recessed apertures 23 provided along the second end 20 of the mounting element 16.

Typically, each dimple 21 has an interior diameter of between approximately 0 and approximately 7.6 centimeters. More typically, each dimple 21 has an interior diameter of between about 2.5 and about 7.6 centimeters. Still more typically each dimple 21 has an interior diameter of between about 2 to about 5 centimeters. For many applications, each dimple 21 has an interior diameter of between about 1.0 and about 1.6 centimeters.

Each dimple also has a depth of between approximately 0.30 and approximately 0.60 centimeters. The aperture 23 in each dimple 21 typically has a diameter of about 0.3175 centimeters. Further, the aperture 23 is concentrically received in the bottom of the dimple 21. Advantageously, the diameter of the dimple 21 allows the head of a fastener, such as a roofing nail, to fit inside the dimple where it will not interfere with the mounting of the next panel. The aperture 21 insures the centering of the nail in the dimple. The bottom wall of the dimple 21 is also slightly curved as illustrated. The size and shape of the dimple 21 insures that the dimple does not collapse or become embedded in the underlying sheathing during installation of the wall panel 10. In this way good ventilation is insured between the wall panel and the underlying sheathing to which it is mounted as discussed in detail below.

In order to complete a wall, it is necessary to vertically stack a series of prefabricated wall panels 10. Each additional row of wall panels 10 is offset with respect to the previous row by the staggered ends 34 provided on the panels in a manner well known in the art. As each succeeding wall panel 10 in each succeeding row is added (see FIGS. 2 and 3), a tongue and groove arrangement ensures proper placement and greatly simplifies installation.

Figure 3:
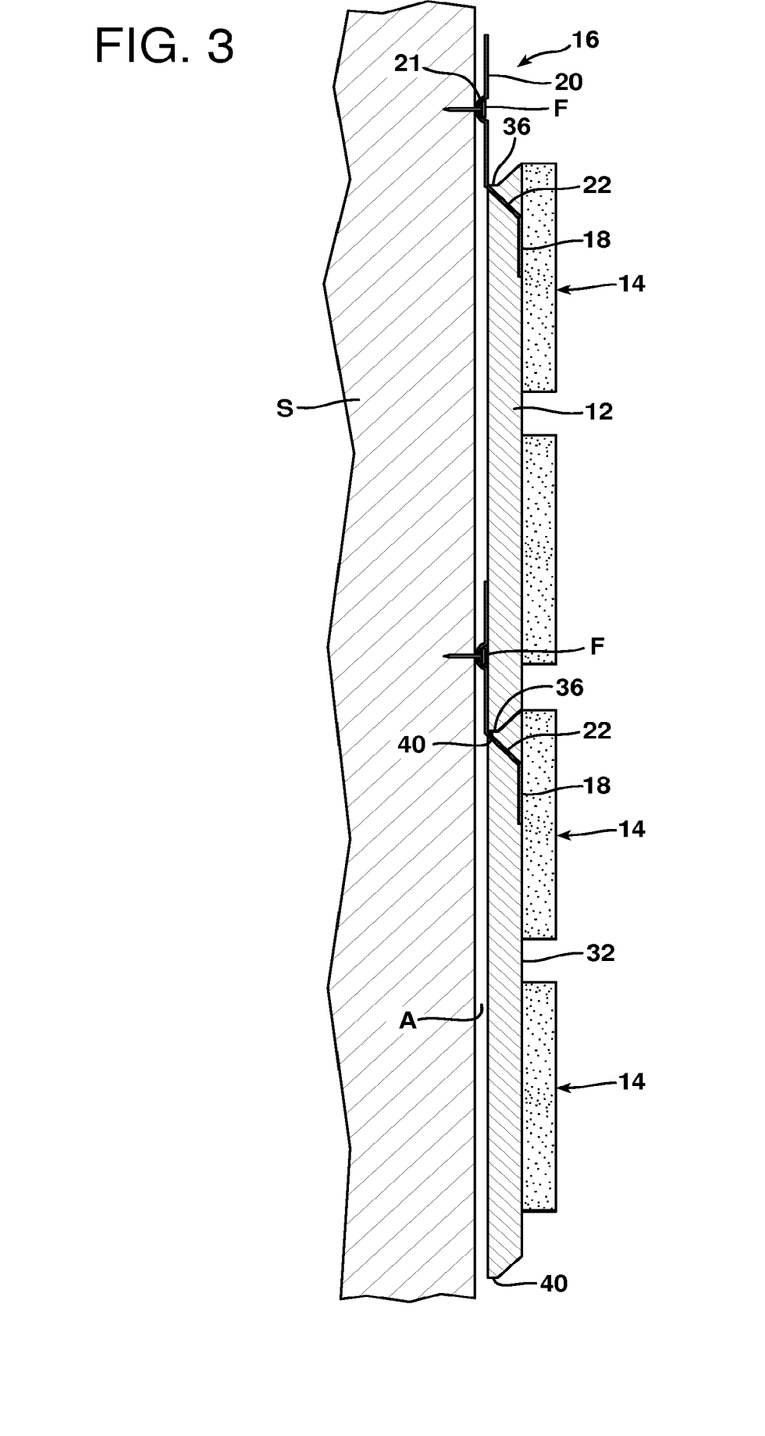
FIG. 3 is a partially schematical and cross sectional view illustrating the mounting of two wall panels, one above the other, along a support substrate such as a wall stud.

More specifically, each wall panel 10 includes a groove 36 formed between the precast body 12 and the front face of the second end 20 of the mounting element 16. The groove 36 is provided in or along the first or top edge 38 of the precast body 12. In the illustrated embodiment, a cooperating tongue 40 is formed by the second or bottom edge of the precast body 12. In alternative embodiments, the tongue 40 could be formed by a metal backer or other similar structure. During installation, the tongue 40 on one wall panel 10 is precisely sized and shaped to be received in the cooperating groove 36 on the underlying wall panel 10. This interconnection ensures proper registration between wall panels 10 during installation. Further, the tongue and groove connection between the wall panels 10 functions to support the wall panel being added in proper position until fasteners F can be positioned in the support substrate S through the recessed apertures 21 to hold the panel in place. Grout is then provided in the grout areas 32 between the design elements 14 on all of the wall panels 10 in order to complete the installation. Weep holes 25 are provided at spaced locations in the second end 18 of the mounting element 16 adjacent the transition section 22. These weep holes 25 allow water to drain from the groove 36. In the illustrated embodiment, a weep hole 25 is provided at the center of each brick design element 14. In another embodiment, the weep hole 25 may not be at the center of each brick design element 14.

Figure 4A:
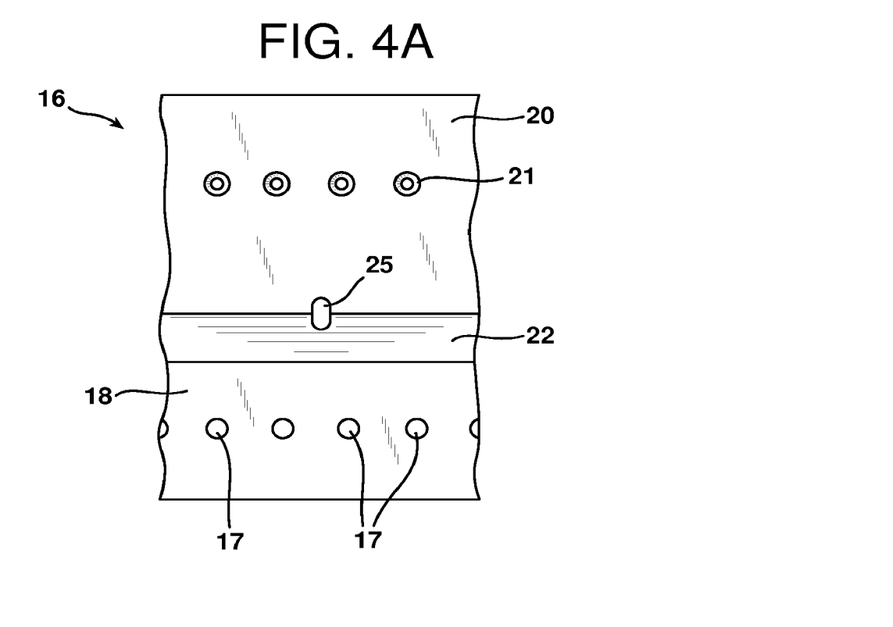
FIGS. 4A-4D are fragmentary front elevational views of four different mounting elements used in the prefabricated wall panel of the present invention.
Figure 4B:
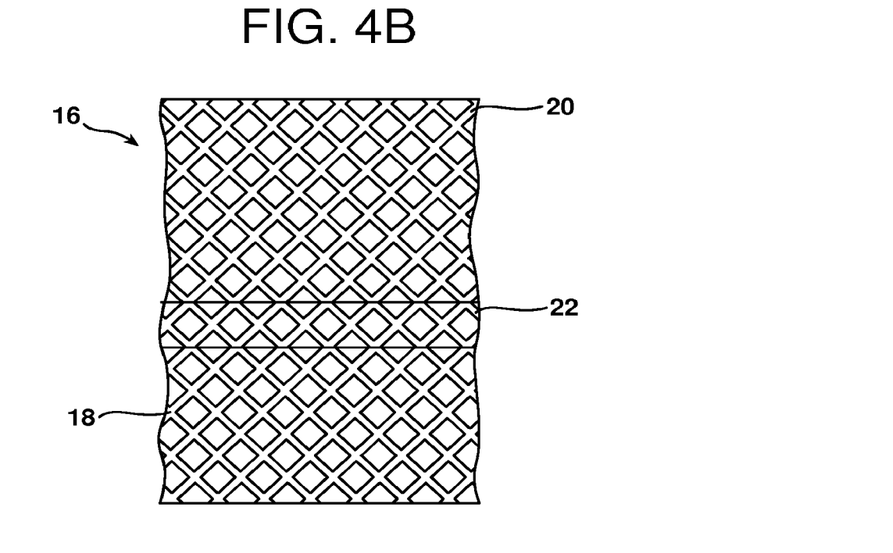
Figure 4C:
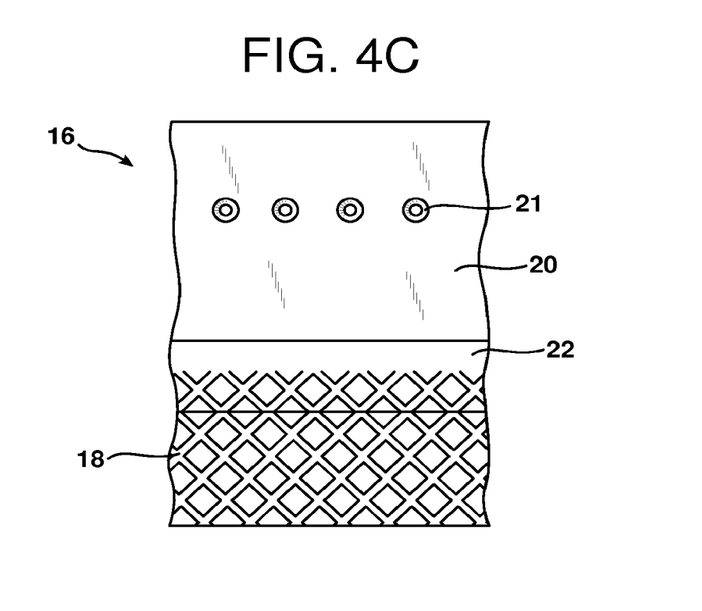
Figure 4D:
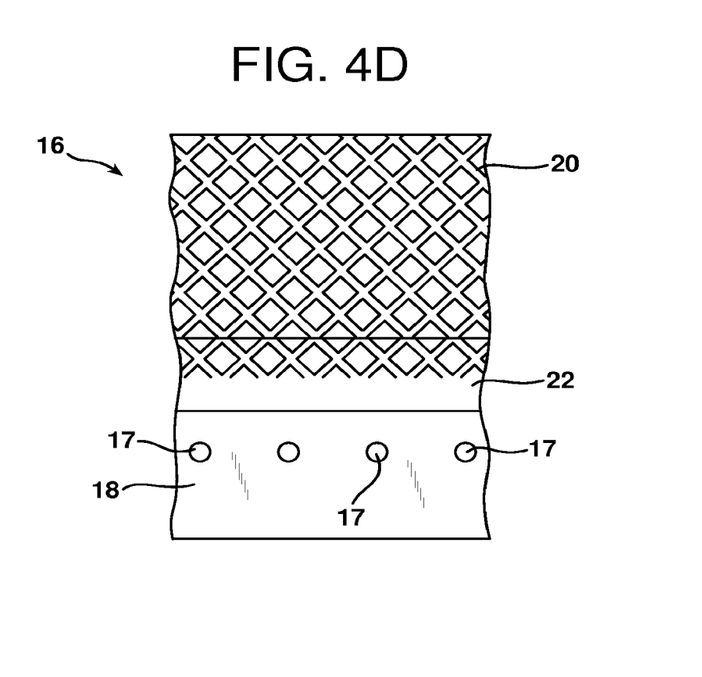

As best illustrated in FIGS. 4A-4D, the mounting element 16 may take a number of forms. As illustrated in FIGS. 1, 2, 3 and 4A, the first end 18 and second end 20 may both be made from a solid piece of material. Alternatively, as illustrated in FIG. 4B, the two ends 18, 20 may both be made from a mesh material (i.e. any perforated material), such as, galvanized steel, aluminum and/or copper. As yet another alternative, FIG. 4C illustrates an embodiment wherein the first end 18 is made from a mesh material and the second end 20 is made from a solid material. In contrast, FIG. 4D illustrates an embodiment where the first end 18 is made from a solid material and the second end 20 is made from a mesh material.

The use of mesh material instead of solid material serves a number of advantages. Good strength is obtained yet less material is used thereby reducing costs of production. Where the first end 18 is made of mesh material, the interlocking of the mounting element 16 in the precast body 12 is enhanced. This is because the cast material is received in and passes through each of the openings in the mesh to provide a most secure interconnection.

Figure 5A:
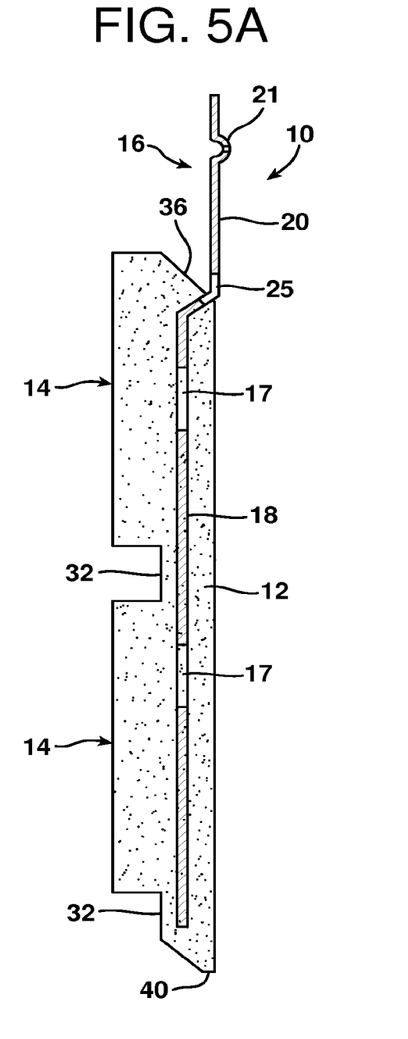
FIGS. 5A-5G are schematical sectional views illustrating several different embodiments of the wall panel of the present invention.
Figure 5B:
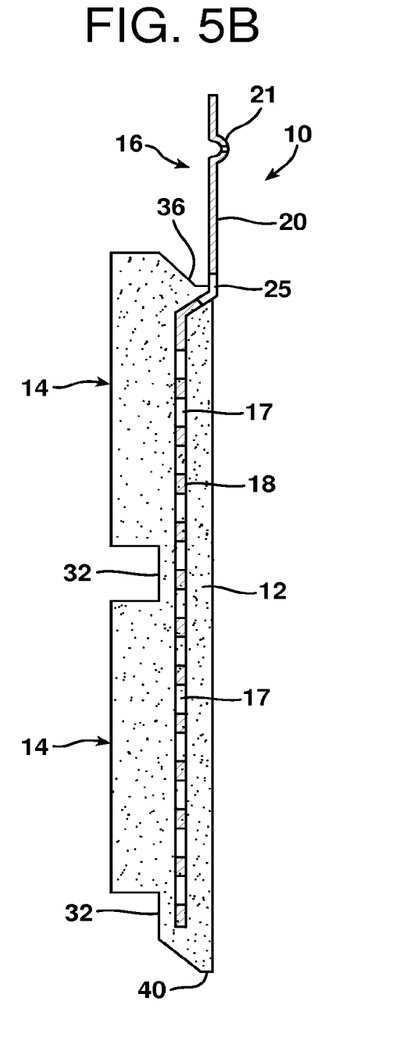

Alternative embodiments for the wall panel 10 are illustrated in FIGS. 5A-5G. In FIG. 5A, the first end 18 of the mounting element 16 is long enough to extend nearly to the end of the tongue 40. This provides added strength to the precast body 12. In this embodiment, the first end 18 of the mounting element 16 is made from solid material including a few spaced keying holes 17 for receiving cast material. In the embodiment illustrated in FIG. 5B, the first end 18 is made from mesh material.

Figure 5C:
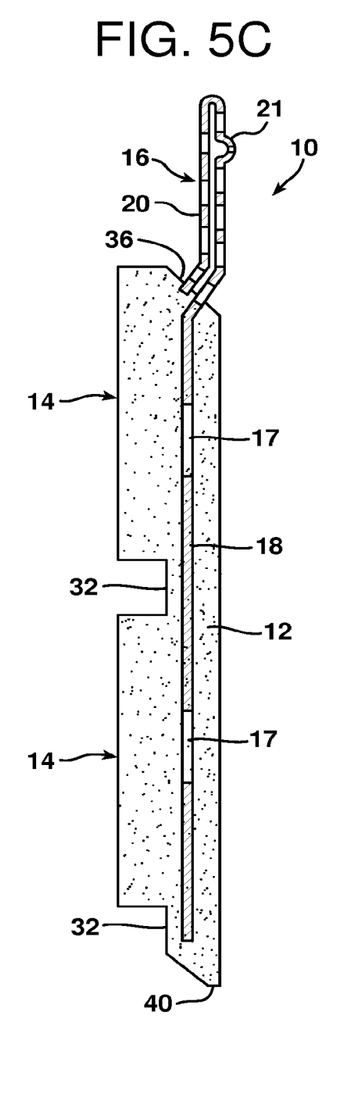
Figure 5D:
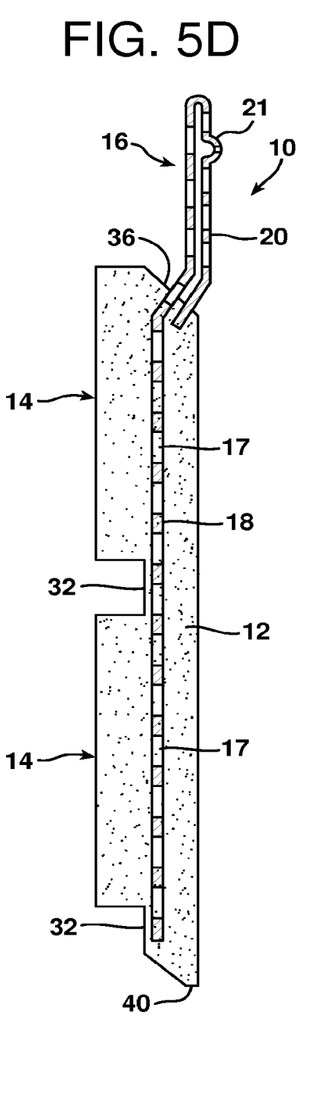

FIG. 5C illustrates a wall panel 10 incorporating a mounting element 16 with a second end 20 constructed from mesh material and an extended first end 18 constructed from solid material but incorporating several keying holes 17. FIG. 5D illustrates yet another alternative embodiment wherein the entire mounting element 16 is made from mesh material including the first end 18.

Figure 5E:
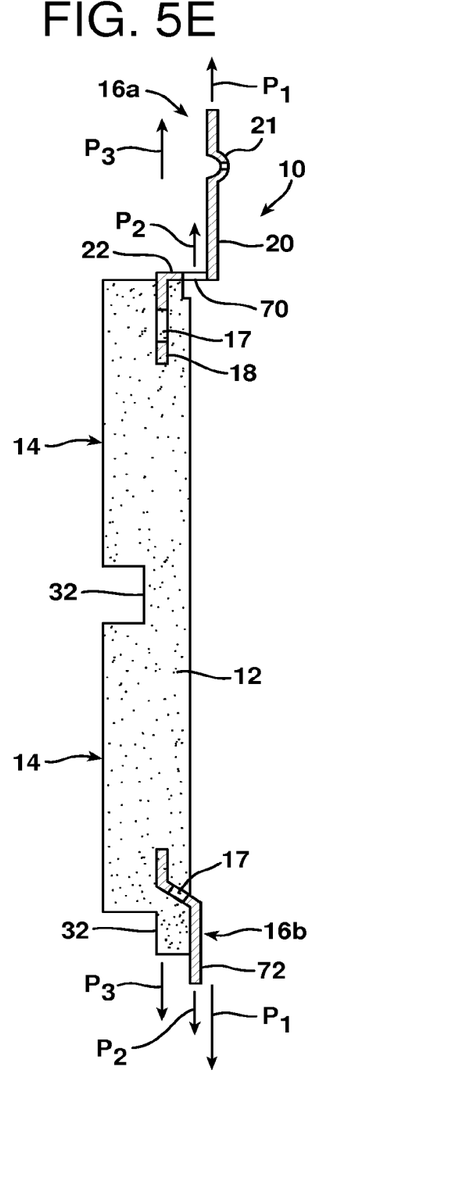
Figure 5F:
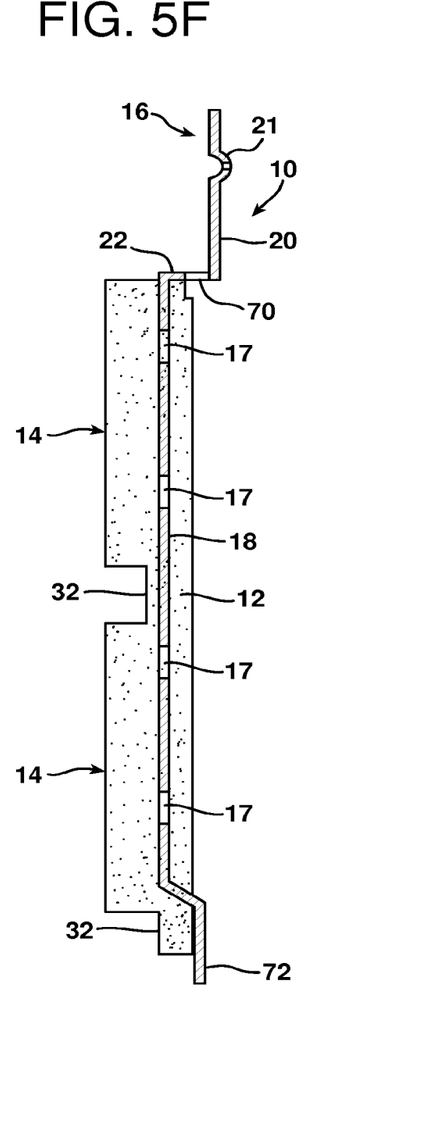
Figure 5G:
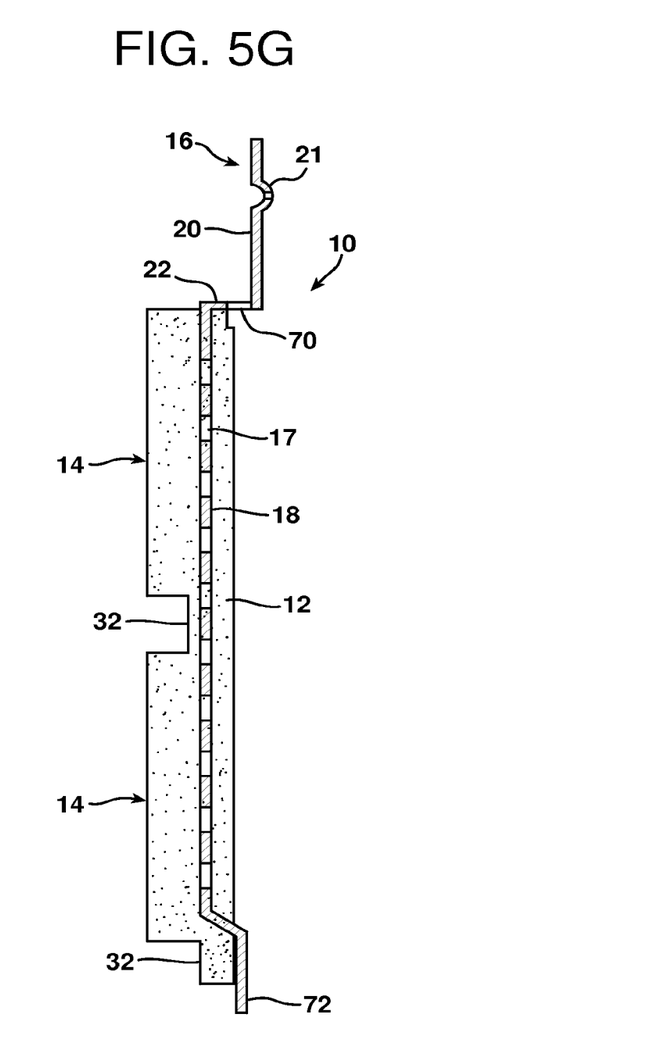

FIGS. 5E-5G illustrate additional alternative embodiments. In FIG. 5E, the mounting element 16 is made from two separate pieces (NOTE: It could be made of three, four or more pieces if desired). The first piece 16a of the mounting element includes a first end 18 embedded in the precast body 12 and extending in a first plane $P_1$, a second end 20 projecting from the precast body 12 and extending in a second plane $P_2$ and a transition section 22 connecting the first and second ends 18 and 20. As further illustrated, the first end includes a keying hole 17 that receives the cast material to ensure that the first piece of the mounting element 16a is securely held in position by the precast body. The second end 20 includes at least one dimple 21 as described above. In addition, the transition section 22 includes a slot 70.

As further illustrated in FIG. 5E, a second mounting element 16b forms a tab 72 projecting from a second edge of the precast body 12. The second piece of the mounting element 16b, like the first piece of the mounting element 16a, includes a keying hole 17 to receive cast material and insure it is securely held in the precast body 12. As illustrated, the slot 70 and the tab 72 both extend in a third plane $P_3$ between the first and second planes $P_1P_2$. Accordingly, a second wall panel 10 may be added to a first wall panel 10 previously secured to a substrate by aligning and inserting the tabs 72 on the second wall panel into the slots 70 on the first wall panel. Thus, the slots and tabs 70, 72 function like the tongue and grooves 40, 36 on the embodiments in FIGS. 1 and 2 to align and secure wall panels 10 together.

FIG. 5F shows yet another alternative embodiment of the slot and tab 70, 72 construction. In this embodiment the mounting element 16 is a single piece incorporating a series of keying holes 17 to allow it to be firmly secured in the precast body 12. This single piece mounting element 16 provides additional strength to the precast body 12.

In the additional embodiment illustrated in FIG. 5G, a single piece mounting element 16 is again illustrated incorporating the slot 70 and groove 72 connection system. Unlike the embodiment illustrated in FIG. 5F, in the embodiment illustrated in FIG. 5G, a portion 74 of the mounting element 16 embedded in the precast body 12 is made from a mesh material.

Figure 6:
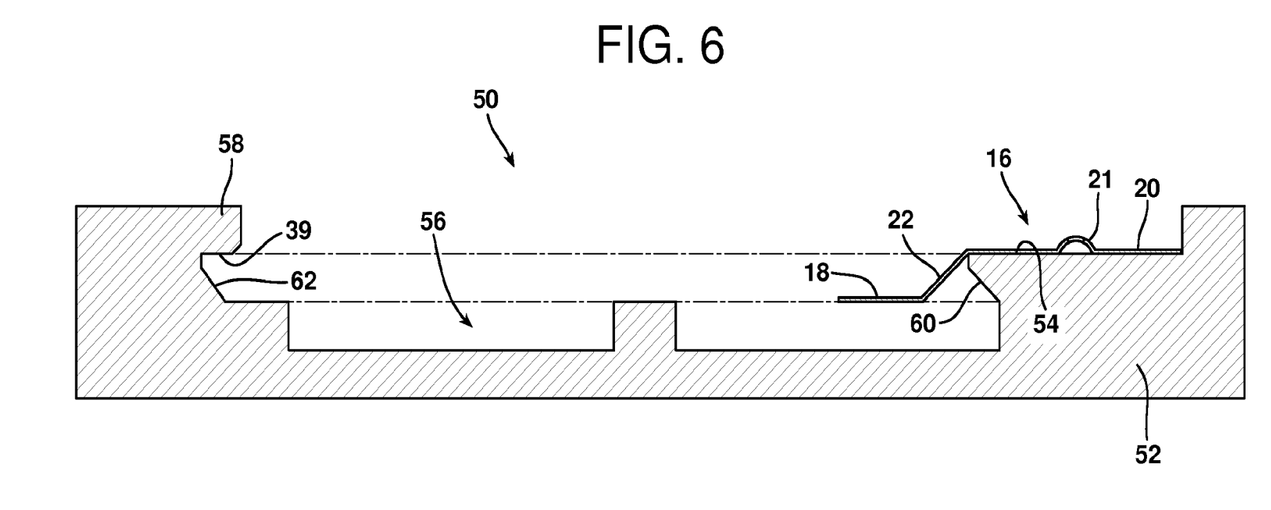
FIG. 6 is a cross sectional view of the mold in which the wall panel of FIGS. 1 and 2 are formed.

A mold 50 for forming a wall panel 10 is illustrated in FIG. 6. The mold 50 comprises a mold body 52 formed from an elastomeric material such as silicone, urethane, polyurethane, and/or latex. The mold body 52 includes a mounting element support surface 54, a mold cavity 56 and a dimensional flap 58 overlying a portion of the mold cavity that forms the tongue 40. Sufficient casting material may be added to the mold 50 above a lowermost surface 39 of the dimensional flap 58 to insure the groove 36 is formed to proper shape. More specifically, the mounting element support surface 54 is provided along a first edge 60 of the mold cavity 56 while the dimensional flap 58 is provided along a second opposite edge 62 of the mold cavity.

The wall panel 10 is produced by positioning a mounting element 16 onto the support surface 54 with the first end 18 extending into the mold cavity 56 and the second end 20 extending from the mold cavity. Casting material may be added to the mold cavity 56 before and/or after positioning the mounting element 16 onto the support surface 54. This may be done by injecting, spraying or any other means known in the art. During this step, the first end 18 of the mounting element 16 is embedded in the casting material.

The method also includes the step of forming the tongue 40 in the mold cavity 56 from casting material captured under the dimensional flap 58. Still further, the method includes forming the groove 36 in the mold 50 between the precast body 12 and the second end 20 of the mounting element 16. After allowing the cast material to set, the wall panel 10 is removed from the mold 50. This may be done by stretching the mold body 52 to free the tongue 40 from under the dimensional flap 58.

The foregoing description of the preferred embodiments of the present invention have been presented for purposes of illustration and description. It is not intended to be exhaustive or to limit the invention to the precise form disclosed. Obvious modifications or variations are possible in light of the above teachings. For example, in the illustrated embodiments, the apertures 23 for receiving a fastener are provided in the protrusion 21. In alternative embodiments, such apertures 23 may be provided substantially anywhere in the body 12. As another example, the illustrated embodiment of FIG. 5E includes a mounting element 16 with a first end 18 extending in a first plane $P_1$ and a second end 20 extending in a second plane $P_2$ where the planes $P_1$ and $P_2$ are parallel to one another. The mounting element 16 could include ends that extend in planes that are not parallel to one another.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

The invention claimed is:

1. A wall panel comprising:
a concrete body comprising a design element and a rear surface; and
a mounting element projecting from the body, the mounting element comprising a first segment embedded in the body and extending in a first plane, a second segment projecting from the body and extending in a second plane different from, and parallel to, the first plane, and a transition section extending onto an upper surface of the body transverse the first plane and the second plane;
wherein the first segment of the mounting element and the transition section form an angle;
wherein the mounting element includes both a slot and a hole each proximate the second segment, wherein the slot is adjacent the rear surface in the transition section, the transition section being configured to receive a tab of an adjacent wall panel; and
wherein the mounting element further comprises a tab that projects from the body in a direction opposite the second segment, the tab being configured for alignment with a slot of an adjacent wall panel.

2. The wall panel of claim 1, wherein the angle is 0° to 180°.

3. The wall panel of claim 1, wherein the second segment of the mounting element is projecting from the rear surface of the body.

4. The wall panel of claim 1, wherein the mounting element is made from a material selected from the group consisting of wood, concrete, cellulose fiberboard, polymer material, composite material, metal, plastic, reinforced plastic, thermoplastic, fiber composite, reinforced wood, steel, corrosion-resistant steel, aluminum, stainless steel, zinc, copper, and combinations thereof.

5. The wall panel of claim 1, wherein the wall panel is configured to interconnect with the adjacent wall panel to form a wall defining a substantially flush rear surface.

6. The wall panel of claim 1, wherein at least a portion of the mounting element is embedded within an interior portion of the body at the rear surface.

7. The wall panel of claim 1, wherein the mounting element further comprises a plurality of keying holes.

8. A wall panel comprising:
a concrete body comprising a design element and a rear surface, the design element configured to face outwardly relative to a supporting wall; and
a mounting element projecting from the body;
wherein the mounting element comprises a first segment extending away from the body and a second segment embedded substantially within an interior portion of the body, the first segment including a plurality of set back features each defining a central aperture therethrough to receive a fastener, each set back feature curving outward from a remainder of the first segment and configured to provide spacing between the rear surface of the concrete body and the supporting wall; and wherein the mounting element further comprises a hole or gap to allow water to drain into the spacing.

9. The wall panel of claim 8, wherein the second segment of the mounting element extends in a second plane parallel to a first plane that includes the first segment.

10. The wall panel of claim 9, wherein the mounting element further comprises a transition section that connects the first segment to the second segment between the first and second planes.

11. The wall panel of claim 8, wherein the mounting element comprises at least two pieces.

12. The wall panel of claim 8, wherein the mounting element is projecting from the rear surface of the body.

13. The wall panel of claim 8, wherein the mounting element is made from a material selected from the group consisting of wood, concrete, cellulose fiberboard, polymer material, composite material, metal, plastic, reinforced plastic, thermoplastic, fiber composite, reinforced wood, steel, corrosion-resistant steel, aluminum, stainless steel, zinc, copper, and combinations thereof.

14. The wall panel of claim 8, wherein the wall panel includes a mating feature compatible with a corresponding mating feature of an adjacent wall panel, the wall panel being configured to interconnect with the adjacent wall panel to form a wall defining a substantially flush rear surface and two set back features curving outward from the flush rear surface to provide spacing between the flush rear surface and the supporting wall.

15. A wall panel comprising:
a concrete body comprising a design element and a rear surface, the design element configured to face outwardly relative to a supporting wall; and
a mounting element projecting from the body;
wherein the mounting element comprises a first segment outside the body and a second segment embedded within the body, the first segment including a plurality of curved set back features each defining a central aperture therethrough to receive a fastener, each set back feature projecting away from the rear surface of the body and away from the second segment, the mounting element configured to provide spacing between the rear surface of the body and the supporting wall and including a hole or gap to allow water to drain into the spacing.

16. The wall panel of claim 15, wherein the mounting element comprises at least two pieces.

17. The wall panel of claim 15, wherein the mounting element is projecting from the rear surface of the body.

18. The wall panel of claim 8, wherein the first segment extends in an upward direction beyond an uppermost edge of the body.

19. The wall panel of claim 1, wherein the slot and the tab both extend in a third plane between the first plane and the second plane.

* * * * *